United States Patent [19]

Spruit et al.

[11] Patent Number: 5,065,377
[45] Date of Patent: Nov. 12, 1991

[54] METHOD OF AND APPARATUS FOR WRITING AND READING A MAGNETO-OPTICAL RECORD CARRIER WITH AN INFORMATION DENSITY GREATER THAN THAT CORRESPONDING TO THE SIZE OF THE SCANNING SPOT

[75] Inventors: Johannes H. M. Spruit; Bernardus A. J. Jacobs, both of Eindhoven, Netherlands

[73] Assignee: U.S. Philips Corporation, New York, N.Y.

[21] Appl. No.: 453,639

[22] Filed: Dec. 20, 1989

[30] Foreign Application Priority Data

Sep. 14, 1989 [NL] Netherlands ............... 8902293

[51] Int. Cl.$^5$ ............................................. G11B 11/00
[52] U.S. Cl. ....................................... 369/13; 369/100; 369/110; 369/116; 360/59; 360/66; 360/114; 346/74.4
[58] Field of Search ............... 346/74.4; 360/59, 114, 360/66; 369/13, 100, 110, 116; 365/122

[56] References Cited

U.S. PATENT DOCUMENTS

| | | | |
|---|---|---|---|
| 3,582,570 | 6/1971 | Cushner et al. | 179/100.2 |
| 3,626,114 | 12/1971 | Lewicki et al. | 179/100.2 |
| 3,736,385 | 5/1973 | Waring, Jr. | 179/100.2 |
| 4,466,004 | 8/1984 | Kobayashi et al. | 346/74.4 |
| 4,922,454 | 5/1990 | Taki | 365/122 |

Primary Examiner—Benjamin R. Fuller
Assistant Examiner—Randy W. Gibson
Attorney, Agent, or Firm—Leroy Eason

[57] ABSTRACT

A method and apparatus for optically writing and reading information as a pattern of magnetic domains in the information recording layer of a record carrier. An optical scanning beam is focused to a diffraction-limited radiation spot for scanning the recording layer, and the region under the spot is subjected to a magnetic field generated by a magnetizing coil energized with a square-wave energizing current having a duty cycle which is modulated in accordance with the information signal. The frequency and amplitude of the energizing current are independent of the information signal, and the frequency thereof exceeds the optical cut-off frequency determined by the size of the radiation spot. Several different values of the information signal can therefore be recorded within a distance equal to the width of the radiation spot in the scanning direction at each position thereof, so that the recorded information density exceeds that corresponding the width of the scanning spot. Read-out is based on the "grey" level produced by the recorded information areas under the scanning spot at each position thereof, so that the same size scanning spot can be used for both writing and reading the record carrier.

26 Claims, 10 Drawing Sheets

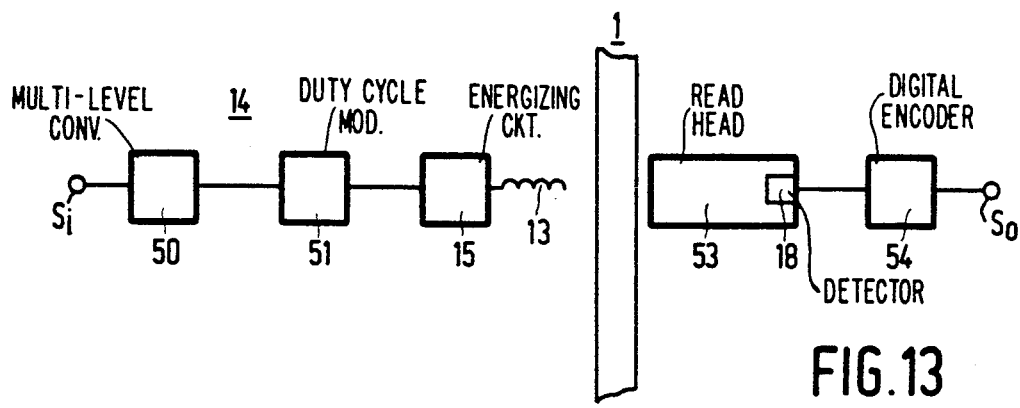
FIG. 13
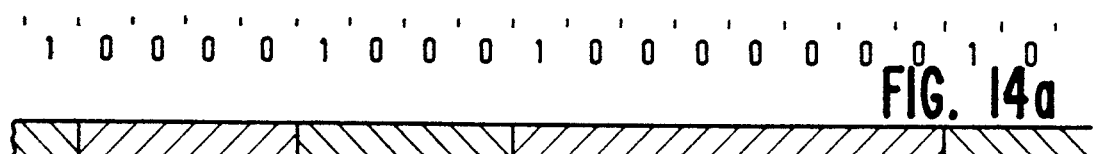
FIG. 14a
FIG. 14b
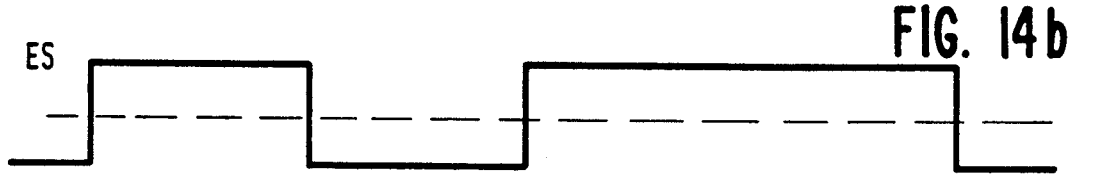
FIG. 14c
FIG. 14d
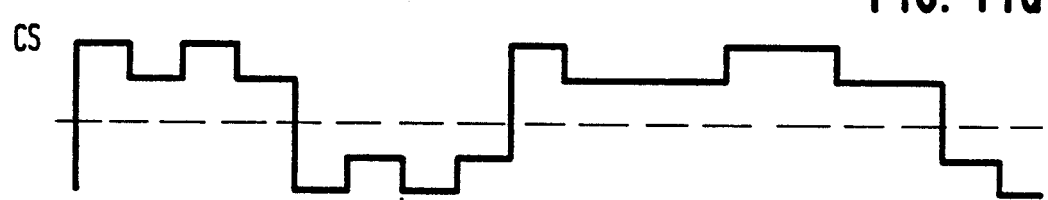
FIG. 14e

METHOD OF AND APPARATUS FOR WRITING AND READING A MAGNETO-OPTICAL RECORD CARRIER WITH AN INFORMATION DENSITY GREATER THAN THAT CORRESPONDING TO THE SIZE OF THE SCANNING SPOT

BACKGROUND OF THE INVENTION

The invention relates to a method of optically writing and reading information as a pattern of magnetic domains having directions of magnetisation which are different from their surroundings in an information layer of a record carrier, the domains being formed by means of an optical scanning beam which is focused to a diffraction-limited radiation spot. During writing the portions of the information layer which are heated by the radiation spot are subjected to the influence of a magnetic field which is oriented substantially perpendicularly to the information layer and is generated by means of a coil through which a square-wave energising current is passed which is modulated in dependence upon an information signal. Thus, first domains having a first direction of magnetisation and second domains having a second direction of magnetisation are alternately formed. Reading is effected by detecting the variation caused by the magnetic domains in the state of polarisation of the scanning beam.

The invention also relates to an apparatus for performing the method.

Such a method of recording information is disclosed in U.S. Pat. No. 4,466,004. Generally, a laser beam, for example a diode laser beam which is focused to a diffraction-limited radiation spot by means of an optical system, is used when inscribing a magneto-optical information layer. The still unwritten information layer is premagnetised in a direction perpendicular to this layer. During writing the portion of the magneto-optical material at the location of the radiation spot is heated to a given temperature, for example, the Curie temperature, so that the coercive force is reduced locally. As a result this portion can be magnetised by a relatively small external magnetic field in a direction opposite to the original direction of magnetisation. After the relevant portion of the magneto-optical information layer has cooled down, the magnetic direction of the external magnetic field is frozen, as it were, into the information layer. By moving the radiation spot and the record carrier with respect to each other and by modulating the external magnetic field, a series of magnetic domains, or information areas, having a direction of magnetisation deviating from their surroundings can be written in the information layer, the succession of the information areas in the direction of movement representing the inscribed information.

In addition to this method, which is known as magnetic field modulation, information may alternatively be inscribed by means of a constant magnetic field having a direction opposite to the original direction of magnetisation of the information layer, and a radiation beam which is pulsed in accordance with the information to be written. The last-mentioned method is known as the laser modulation method. When using the laser modulation method, the size of the information areas is determined by the size of the radiation spot. In known systems, in which the radiation spot has a half-value width of approximately 1 μm, the information areas are substantially circular with a diameter of the order of 1 μm. The information density is then of the order of 300,000 bits per mm$^2$.

There is an ever increasing need of larger information densities so that more information can be stored in a record carrier of given dimensions. To this end it must be possible to write and read information areas which are smaller than those hitherto used in a magneto-optical record carrier.

In U.S. Pat. No. 4,466,004 it is proposed to provide information areas in the form of magnetic domains in a magneto-optical record carrier, which areas have a dimension in the scanning direction which is smaller than the dimension of the write radiation spot, by switching the magnetic field at a high frequency. Firstly, the area of the information layer under the radiation spot is magnetised in a direction opposite to the original direction of magnetisation of the information layer. Then, while the radiation spot is still partly above this area, the magnetic field is reversed so that the a portion of the area acquires the original direction of magnetisation again. U.S. Pat. No. 4,466,004 does not describe how the magnetic domains with their smaller dimension in the scanning direction thus obtained can be read.

Since each information bit is recorded as one information area, each information area must be read separately. This means that reading must be performed by means of a radiation spot whose dimension in the scanning direction is of the same order as the dimension in that direction of the information areas. The read-radiation spot must therefore be considerably smaller than the write-radiation spot.

Since the size of a diffraction-limited radiation spot is proportional to $\lambda/NA$, in which $\lambda$ is the wavelength of the radiation used and NA is the numerical aperture of the objective system used, the radiation spot may only be reduced by decreasing the wavelength and/or enlarging the numerical aperture. An enlargement of the numerical aperture involves a decrease in the depth of focus of the radiation beam, so that the requirements to be imposed on the focusing of the radiation beam become more stringent. Moreover, an objective system having a larger numerical aperture is more sensitive to aberrations so that stricter tolerance requirements must be imposed on the write-read apparatus. If a diode laser is to be used as a radiation source, which is necessary in a mass product which the magneto-optical write-read apparatus envisages to be, the reduction of the wavelength of the radiation beam is not a real possibility because there are no short wavelength diode lasers which yield a sufficiently high power for writing.

SUMMARY OF THE INVENTION

The present invention provides a novel possibility of increasing the information density in a magneto-optical record carrier and whereby the size of the read radiation spot need not be reduced. This novel possibility is realised by means of a novel method which is characterized in that the frequency and amplitude of the magnetic energising current are independent of the information signal to be written, in that said frequency is at least equal to the optical cut-off frequency determined by the size of the scanning spot, and in that the ratio between the square-wave pulse time interval and the period of the energising current is modulated in dependence upon the information signal, so that magnetic domains are written with a varying ratio between the domain length and the domain period in the scanning direction, different values of said ratio representing different values of the written signal.

An optical scanning system in which radiation at a given wavelength, $\lambda$, and an objective lens having a given numerical aperture, NA, are used, has an optical cut-off frequency $f_{co}$ which is proportional to $2.NA/\lambda$, i.e. inversely proportional to the size of the scanning spot. Such a system can no longer separately observe details of an object, in this case the respective information areas in the information layer, if the mutual distance between these details or areas is equal to or smaller than the reciprocol of $2.NA/\lambda$. Thus, a given spatial frequency of the information areas is associated with this optical cut-off frequency.

The invention is based on the recognition that one and the same radiation spot can be used, both for writing and for reading information in a magneto-optical information layer in the form of information areas which are considerably smaller than this radiation spot, by choosing the spatial frequency $f_r$ of these information areas to be equal to or larger than the cutoff frequency $f_{co}$ and by recoding the information as the ratio between the length of these areas and the period p ($p=1/f$) thereof. The variation of this ratio, known in literature as "duty cycle" modulation, causes a modulation, during reading, in the read beam originating from the information layer, which beam passes through the objective system and is captured by a radiation-sensitive detection system. This detection system then provides an electric signal which is modulated in accordance with the written information, in spite of the fact that the individual information areas are no longer detected. As it were, different grey levels are now written and read, with each grey level representing a given information signal value, instead of a black-white structure as has hitherto been conventional.

It is to be noted that it is known per se from European Patent Application no. 0,284,056 to write different signal levels in a magneto-optical information layer so as to increase the information density. In accordance with the known method, however, the intensity of the write beam is varied so that the level within the information layer, at which the material is heated above the Curie point and the direction of magnetisation can be reversed, is also varied. However, a relatively thick information layer must then be used and the radiation beam must have a high intensity. Moreover, such a thermal process is difficult to control due to the thermal diffusion. In accordance with the method described in European Patent Application no. 0,284,056 the written information areas are individually detected.

The method according to the invention may be performed with various known magnetic materials as an information layer, such as an alloy of gadolinium, terbium and iron. However, the method is preferably further characterized in that an alloy of terbium, iron and cobalt is used for the information layer.

This material is eminently suitable for writing very short magnetic domains. When using the invention, the magnetic domains may have lengths of the order of 0.1 $\mu m$ and the information density in the longitudinal direction now becomes 0.3 $\mu m$/bit instead of the conventional 0.45 $\mu m$/bit.

The energising current may have a varying frequency and constant square-wave pulse time intervals, so that magnetic domains can be written which have a constant length in the scanning direction and a varying spatial frequency.

However, the method according to the invention is preferably further characterized in that the energising current has a constant frequency and varying square-wave pulse time intervals. Then magnetic domains are written whose length in the scanning direction varies, while the spatial frequency of such domain is constant. The advantage of this method is that very light levels up to and including "white" can be written because one of the square-wave time intervals can be rendered arbitrarily short.

A first embodiment of the method according to the invention is characterized in that the ratio between the square-wave pulse time intervals and the period of the energising current is continuously varied in accordance with the variation of the information signal so that the information is recorded in an analog form.

The information may alternatively be recorded in a digital form. This is realised by means of a second embodiment of the method according to the invention, which is characterized in that the energising current has a fixed frequency and in that the ratio between the square-wave pulse time intervals and the period of the energising current can be varied in n discrete steps, in which n is an integer. The information signal presented is now recorded, as it were, in n different grey levels. If $n=8$, i.e. for eight grey levels on the record carrier, use can be made of an encoding which in addition to the values "1" and "0" also uses 1/7, 2/7, 3/7, 4/7, 5/7 and 6/7. The frequency of the energising current pulses is now, for example, equal to a number of times the clock frequency of the encoding.

The energising current frequency may be higher or lower than the clock frequency, provided that the condition is satisfied that the spatial frequency of the magnetic domains is equal to or larger than the optical cut-off frequency.

Due to the high recording speed a write beam having a constant and high intensity level is preferably used. This ensures in the simplest manner that the material of the information layer is at all times heated sufficiently so as to locally change its direction of magnetisation in dependence upon the magnetic field modulation.

Under certain circumstances a pulsed write beam may alternatively be used. Since the radiation energy is applied in a pulsed manner, the temperature gradient in the boundary region of a magnetic domain to be formed is very high so that the accuracy with which the boundaries of the magnetic domain are fixed is great. When reading the pattern of magnetic domains, this results in an improved signal-to-noise ratio. Furthermore, pulsed operation of a diode laser leads to a smaller load on this laser so that diode lasers of certain types have a longer lifetime.

The method in which a pulsed write beam is used and in which, viewed on a time axis, each radiation pulse is located proximate to a point of reversal of the energising current is characterized in that the end of each radiation pulse coincides with the instant when the magnetic field whose sign is changed has substantially reached its final value.

This ensures that at the moment when the local temperature of the record layer is maximum, the external magnetic field has a strength in the desired direction which is sufficient to magnetise the relevant local area in the desired direction.

A second aspect of the present invention relates to the apparatus for performing the novel method. This apparatus comprises a radiation source for supplying a scanning beam, an objective system for focusing the scanning beam to a diffraction-limited radiation spot on the information layer, a radiation-sensitive detection system for converting the beam from the information layer into an electric signal, a magnet coil for generating a magnetic field which is directed substantially perpendicularly to the information layer in the scanned portion of the information layer, and an energising circuit for generating a square-wave energising current in the coil which is modulated in dependence upon an information signal. The apparatus is characterized by a control circuit controlling the energising circuit, in which control circuit an input information signal is converted into a square-wave signal having a frequency which is at least equal to the optical cut-off frequency related to the size of the scanning spot, and having a varying ratio between the square-wave time intervals and the signal period.

An illustrative embodiment of the present invention involves apparatus for forming information areas with a constant length and a varying period being characterized in that the control circuit comprises a frequency modulator to whose input the information signal to be written is applied and whose output is connected to the input of a monostable multivibrator which supplies the control signal for the energising circuit.

A preferred illustrative embodiment of the apparatus with which information areas with a constant period and a varying length are written is characterized in that the control circuit comprises a comparator, a first input of which is connected to a triangular voltage generator, while the information signal to be written is applied to the second input, the output of said comparator supplying the control signal for the energising circuit.

For writing a signal in accordance with a multilevel coding, the last-mentioned embodiment may be used if it is further characterized in that the second input of the comparator is connected to the output of a converter which converts the information signal to be written and presented to its input into a multi-level signal.

The apparatus is preferably further characterized in that the radiation source is adapter to supply a write-scanning beam having a constant intensity.

A further illustrative embodiment of the apparatus is characterized in that the radiation source is adapted to supply a pulsed write-scanning beam and in that a synchronising circuit is provided for maintaining a predetermined phase relation between the radiation pulses and the points of reversal of the energising current.

This embodiment is further preferably characterized in that the predetermined phase relation is chosen to be such that the end of each radiation pulse coincides with the instant when the magnetic field whose sign is changed has substantially reached its final value.

BRIEF DESCRIPTION OF THE DRAWING

The invention will now be described in greater detail by way of example with reference to the accompanying drawings in which FIG. 13 shows diagrammatically an embodiment of an apparatus for writing a digital information signal according to the invention, FIGS. 14a-14e show, inter alia, the channel bit current, the energising current for generating the magnetic field and the pattern of magnetic domains obtained therewith according to the invention.

DETAILED DESCRIPTION

Figure 1:
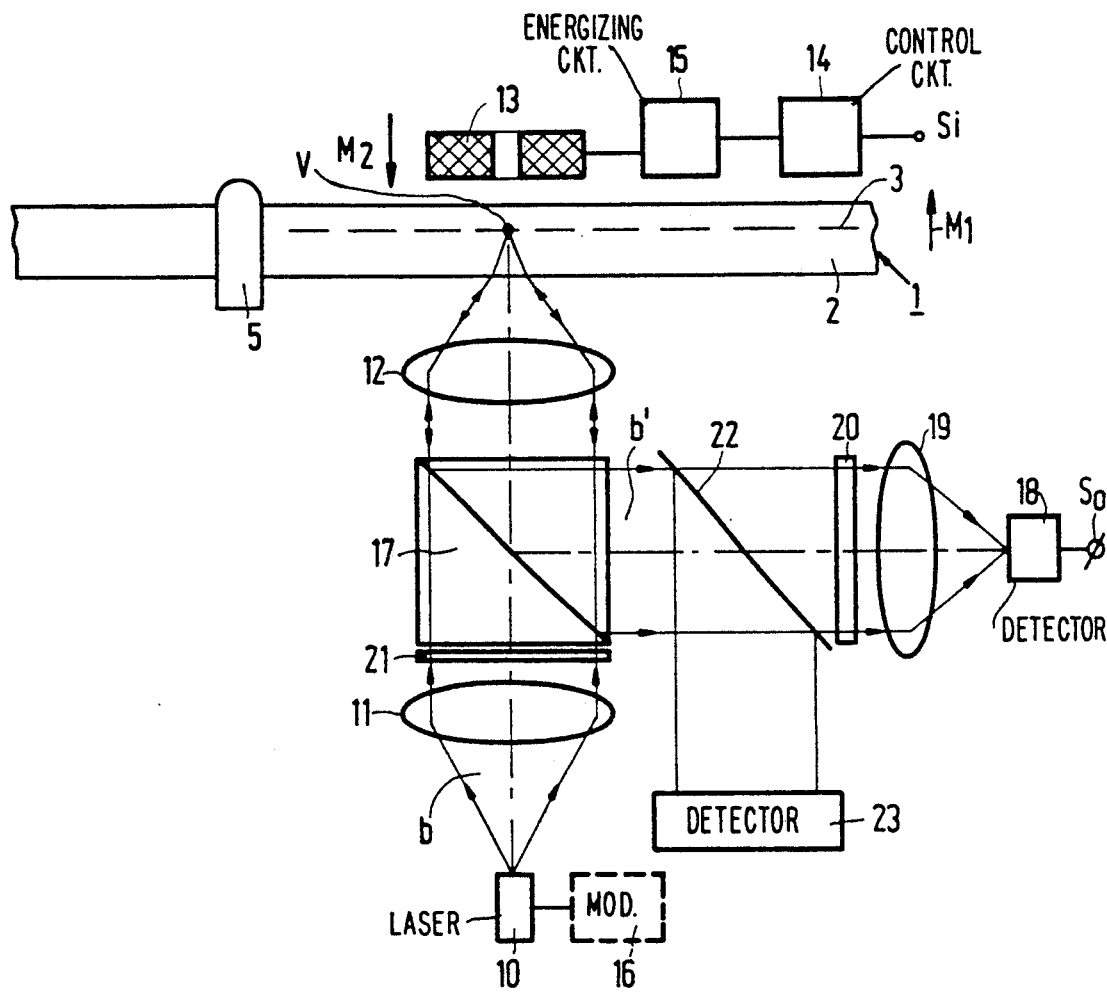
FIG. 1 shows an embodiment of a write-read apparatus for a magneto-optical record carrier according to the invention.

In FIG. 1 the reference numeral 1 denotes a magneto-optical record carrier, comprising a transparent substrate 2 and a magnetic information layer 3. This information layer is irradiated by a radiation beam b which is supplied by a radiation source 10. This source is formed by a diode laser, for example, an AlGaAs laser emitting radiation at a wavelength of the order of, for example 800 nm. A part of the radiation emitted by the diode laser is captured by a collimator lens 11 and focused by an objective system 12, which is shown diagrammatically by means of a single lens, to a diffraction-limited scanning spot V having a half-value width of the order of 1 μm in the information plane.

Information areas in the form of magnetic domains are written in the layer 3 by controlling the diode laser in such a way that it emits a beam with a sufficiently high power, for example, 5 mWatt so as to heat the region of the information layer 3 at the location of the spot V to, for example, the Curie temperature, and by modulating the magnetic field in accordance with the presented information signal $S_i$. This signal is applied to a control circuit 14 which controls the current supplied by an energising circuit 15. The energising circuit applies the energising current to a coil 13. The magneto-optical layer 3 is, for example, premagnetised in a given direction indicated by the arrow $M_1$. By heating the layer 3 at the location of the radiation spot V, the coercive force at this location decreases and the direction of magnetisation can be locally reversed by means of a relatively small external magnetic field generated by means of the magnetic coil 13, in accordance with the arrow $M_2$ in FIG. 1. After the local supply of heat is terminated, for example, because the radiation spot has been moved, the material of the layer 3 cools down again and, as it were, the direction $M_2$ of magnetisation is frozen.

Figure 2:
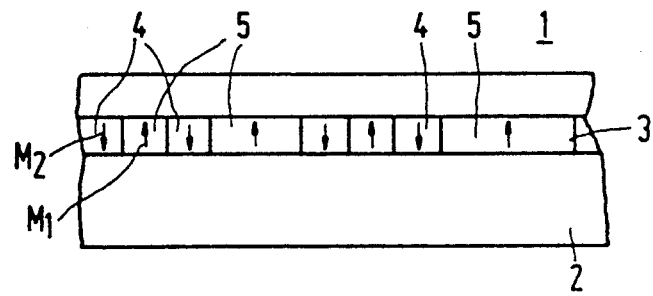
FIG. 2 shows in cross-section a part of an information track written by means of a known method.

By moving the radiation spot V and the record carrier 1 with respect to each other, in the case of a round disc-shaped record carrier, for example, by rotating the record carrier around the shaft 5, a plurality of information areas can be successively written in the scanning direction so that an information track is produced. FIG. 2 shows a small portion of such an information track in a cross-section. The areas of the information layer 3 where the direction of magnetisation is reversed ($M_2$) are referred to as information areas 4, and the areas which have maintained the original direction of magnetisation ($M_1$) are referred to as intermediate areas 5. Moreover, by moving the radiation spot V and the record carrier 1 with respect to each other in a direction perpendicular to the plane of the drawing in FIG. 1, in the case of a round disc-shaped record carrier in the radial direction, a plurality of tracks can be written.

When reading the written information, diode laser 10 is also used in the apparatus of FIG. 1. However, this laser is then operated at a considerably lower power, for example, ten times lower than during the writing operation so that the stored information is not affected. The record carrier is preferably reflective so that the beam, as modulated by the information layer in accordance with the written information, is reflected to the objective system 12. The radiation path incorporates a semi-transparent element, for example, a 70% transparent mirror or prism 17 which reflects a portion of the reflected modulated read beam b' to a radiation-sensitive detection system 18. In the embodiment of FIG. 1 a lens 19 for concentrating the radiation on the detection system 18 is arranged between the element 17 and this system.

Reading of the information layer is based on the change which the information areas, or domains, 4 cause in the state of polarisation of the read beam. To detect this change, a polarisation analyser 20 is arranged in the radiation path in front of the detection system 18, which analyser converts the polarisation modulation into an intensity modulation which is converted by the detection system into an electric signal $S_0$. A polariser 21 whose direction of polarisation effectively extends at an angle of, for example 85° to that of the analyser 20 may be arranged in the radiation path of the ongoing read beam b.

In order to be able to ascertain during reading whether the read spot is centered on the information track and/or whether the read beam is focused on the information plane, a partly transparent mirror, for example, a 90% transparent mirror or prism 22 may be arranged in the radiation path of the reflected beam b' reflecting a part of this beam to a second radiation-sensitive detection system 23. The electric signals supplied by this detection system are used to correct the tracking and focusing. Also during writing the tracking and focus-servo systems may be used in which the portion of the write beam then reflected by the record carrier is utilised. For further details about writing and reading of a magneto-optical record carrier and about its arrangement referece may be made to the article "Erasable Magneto-Optical Recording" in "Philips Technical Review" 42, no. 2, August 1985, pages 37–47.

Figure 3:
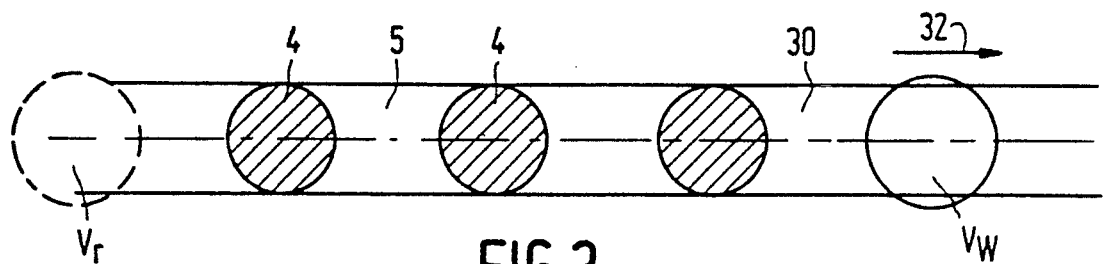
FIG. 3 shows the size of the information areas written by means of the known method with respect to the size of the write and read spot used.

In the conventional method of magneto-optical recording magnetic domains are written with a surface area of the order of that of the radiation spot. FIG. 3 shows the write spot $V_w$ of a known magneto-optical apparatus and a plurality of information areas 4 written by means of this spot. The information areas are arranged in accordance with an information track 30. This track is only partly written. During writing the write spot moves with respect to the information plane to the right in accordance with the arrow 32. In the situation shown in FIG. 3 the write spot is present above an unwritten portion and in a position where a subsequent information area can be written. The information track is read at a later stage by means of the read spot $V_r$ which is shown to the left in FIG. 3 for the sake of clarity, but in reality the spots $V_r$ and $V_w$ coincide.

When using the known magneto-optical apparatus, the information density is determined by the size of the scanning spot V which functions as both a write and a read spot. As already noted in the opening paragraph, an increase of the information density by reducing the scanning spot is not very well possible in practice. According to the present invention the information density is increased, when using a scanning spot of the conventional size, by writing magnetic domains whose length is considerably shorter than the diameter of the scanning spot and whose frequency is equal to or larger than the so-called optical cut-off frequency, while the information is represented by the varying ratio between the length of the information areas and their periods.

The notion of optical cut-off frequency of a magneto-optical apparatus and the relation between the size of the information. areas and the optical cut-off frequency can be explained in the simplest manner by considering the structure of magnetic domains as a structure of areas alternately transmitting radiation and not transmitting radiation in the case of transmission reading, or as a structure of areas alternately reflecting and not reflecting in the case of reflection reading. This is allowed because the polarisation rotation caused by the magnetic domains in combination with the use of polarisation detection means in the apparatus results in an amplitude modulation of the read beam.

The structure consisting of information areas can be considered as a two-dimensional diffraction grating which splits the incident scanning beam into a non-diffracted zero-order subbeam, a plurality of first-order subbeams and a plurality of higher order subbeams. For reading, only the zero-order and first-order subbeams deflected in the tangential direction are important because the higher order subbeams have only a small energy.

Figure 4A:
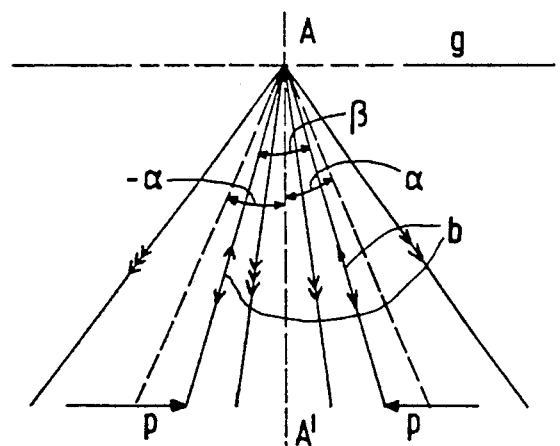
FIGS. 4a and 4b show diagrammatically a known principle of optical diffraction reading.
Figure 4B:
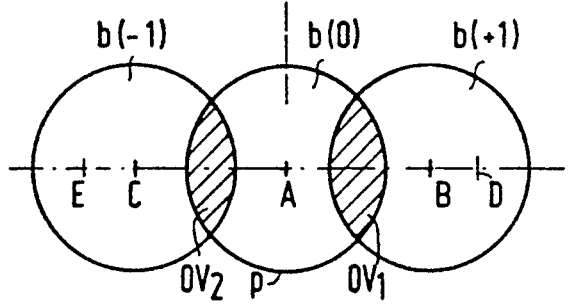
Figure 5A:
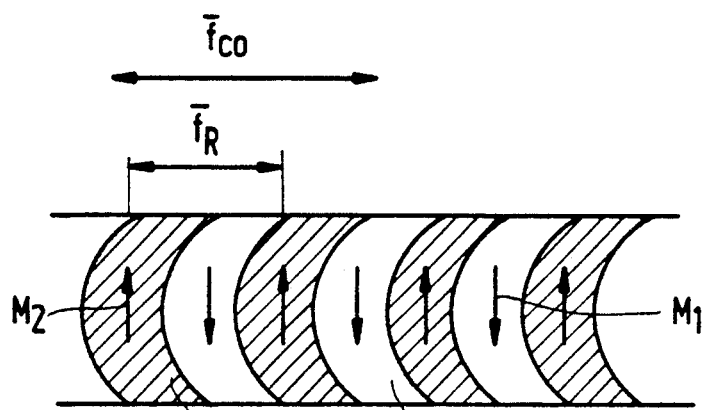
FIGS. 5a-5e show examples of information track portions with different ratios between the length of the information areas and their periods according to the invention.
Figure 5B:
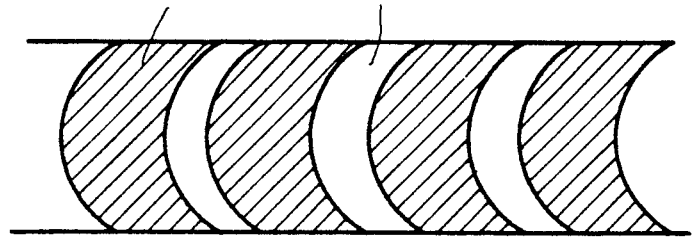
Figure 5C:
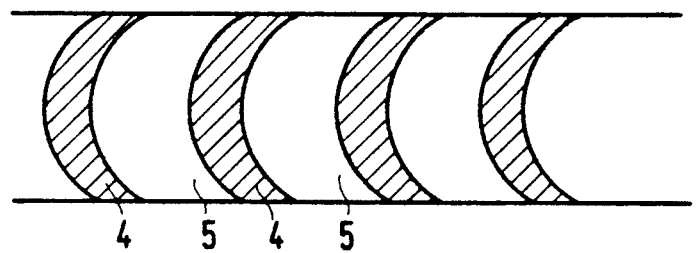
Figure 5D:
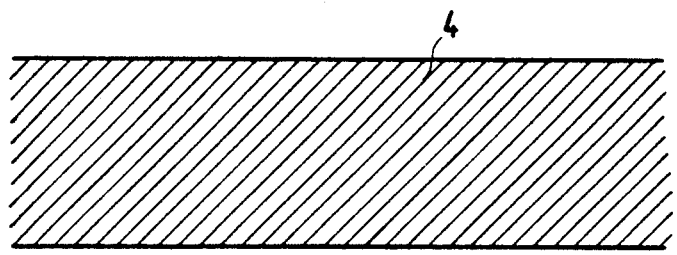
Figure 5E:
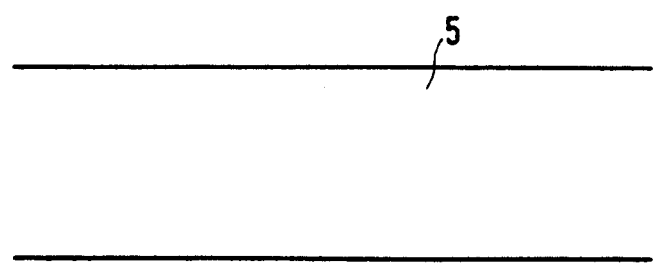

FIG. 4a shows a linear grating g in a cross-section. This grating is illuminated by means of a beam b from an objective of which only the pupil p is shown. The grating g reflects the beam and splits it into a zero-order subbeam b(0), a +1 order subbeam b(+1), a −1 order subbeam b(−1) and a plurality of higher order subbeams which are not shown. The subbeams b(+1) and b(−1) are deflected at angles of +α and −α respectively. FIG. 4b shows the cross-sections of the beams at the location of the pupil.

The subbeam b(0) which has the same aperture angle $\beta$ and the same direction as the incident beam b falls entirely within the pupil and is passed on to a detector (18 in FIG. 1) in the case of an optical scanning apparatus with which the information grating g is read. The zero-order subbeam does not comprise any information about the succession of the information areas and intermediate areas, but such information is particularly present in the first-order subbeams b(+1), b(−1). Only the portions denoted by the shaded areas $OV_1$ and $OV_2$ of these subbeams fall within the pupil of the objective. In the known read method use is made of the phase variations in the subbeams b(+1) and b(−1) with respect to the zero-order subbeam. In the areas $OV_1$ and $OV_2$ in FIG. 4b the first-order subbeams overlap the zero-order subbeam and interferences occur. When moving the scanning spot along an information track, the phases of the first-order subbeams change. As a result the intensity of the total radiation passing through the objective and reaching the detector changes.

If the centre of the scanning spot coincides with the centre of an information area, for example, a pit, there is a given phase difference $\psi$ between a first-order subbeam and the zero-order subbeam. This phase difference is also referred to as phase depth of the information structure. If the scanning spot moves from a first information area to a second area, the phase of the +1 order subbeam increases and this phase is increased by $2\pi$ at the moment when the centre of the scanning spot has reached the centre of the second information area. The phase of the −1 order beam then decreases. The phases of the first-order subbeams with respect to those of the zero-order subbeam can thus be represented as $$\phi(+1) = \psi + 2\pi \frac{x}{p_t}$$

$$\phi(-1) = \psi - 2\pi \frac{x}{p_t}$$

in which x is the position in the tangential direction of the scanning spot and $p_t$ is the local tangential period of the information structure. The electric output signals of two detectors arranged behind the areas of overlap $OV_1$ and $OV_2$ can then be represented by $$S_1 = \cos\left(\psi + 2\pi \frac{x}{p_t}\right)$$

$$S_2 = \cos\left(\psi - 2\pi \frac{x}{p_t}\right)$$

By adding these detector signals, the information signal $S_i$ is obtained:

$$S_i = S_1 + S_2 = 2 \cdot \cos\psi \cos 2\pi \frac{x}{p_t}$$

The above applies only as long as there is overlap between the subbeams b(+1) and b(−1) on the one hand and b(0) on the other hand. The angle $\alpha$ at which the first-order subbeam is deflected is given by $\sin\alpha = \lambda/p_t = \lambda \cdot f_r$ is the spatial frequency of the grating g or the local spatial frequency of the information structure. There is no overlap if $\alpha = 2\beta$. Since $\sin\beta = NA$, the optical cut-off frequency $f_c$ is given by:

$$f_{co} = 2\frac{NA}{\lambda}$$

Information areas which have such a spatial frequency that $\alpha > 2\beta$ can no longer be detected separately so that the information can no longer be read if it is coded in the frequency of these areas.

However, if as proposed in the present invention, the frequency $f_r$ of the information areas is so high that only the zero-order beam passes through the read objective but the value of the information signal is no longer coded in one individual area but in a plurality, for example, three areas, this information can be read. The fact is then utilised that at any moment the amplitude of the zero-order beam is determined by the ratio between the total length of information areas and the total length of the intermediate areas which are under the read spot at that moment. The magnetic domain structure is now observed, as it were, as a structure of areas having different grey hues, with each grey hue corresponding to a given value of the said length ratio.

This is illustrated in FIG. 5. FIG. 5a shows a portion of an information track in which the length of the information areas 4, magnetic domains with a direction of magnetisation $M_2$, is equal to that of the intermediate areas 5, magnetic domains with a direction of magnetisation $M_1$. The so-called duty cycle dc then is: dc=50% and the relevant portion is observed as a medium grey portion. In FIG. 5b the information areas are three times as long as the intermediate areas 5, hence dc=75% and this portion of the information track is observed as dark grey. FIG. 5c shows a light grey portion of an information track with dc=25%, i.e. with information areas 4 whose length is one third of that of the intermediate areas 5. In FIG. 5d the information areas 4 blend with each other so that dc=100° and this information track portion is observed as black. The track portion of FIG. 5e does not comprise any information areas 4 but only intermediate areas 5 which blend with each other. This track portion for which dc=0% is observed as white. The parameters $\overline{f_{co}}$ and $\overline{f_r}$ represent the optical cut-off frequency $f_{co}$ and the write frequency $f_r$ respectively transformed to the spatial domain, and $\overline{f_{co}}$ may be, for example 0.8 $\mu$m and $\overline{f_r}$ may be, for example 0.70 $\mu$m.

Figure 6:
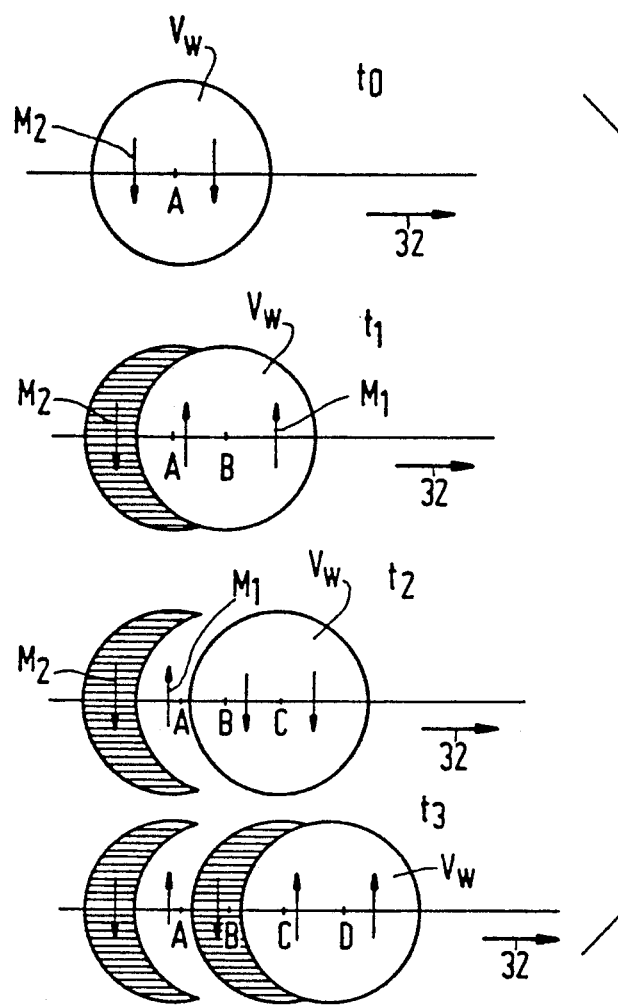
FIG. 6 shows the principles of writing shorter information areas according to the invention.

To be able to write with a given write spot information areas having a surface length which is smaller than the size of the spot, use is made of the known principle illustrated in FIG. 6. In this Figure the radiation spot is considered to be viewed in the direction of the ongoing beam b in FIG. 1. It has been assumed that the write spot moves to the right with respect to the information plane (arrow 32). At the instant $t_0$ the centre of the write spot $V_w$ is in the position A. At that moment the external magnetic field has the direction of the arrow $M_2$ in FIG. 1 and the entire circular area under the radiation spot is magnetised in that direction. At the instant $t_1$ the centre of the radiation spot $V_w$ has arrived at point B. The direction of the magnetic field is then reversed so that the area which is now under the spot $V_w$ is magnetised in the direction $M_1$. Since the distance between B and A is considerably smaller than the diameter of the write spot, a large part of the area which was magnetised in the direction $M_2$ at the instant $t_0$ is magnetised again in the original direction $M_1$. The result is that only a small part, which is shaded in FIG. 6, of the area which was present under the write spot at the instant $t_0$ remain magnetised in the direction $M_2$ and forms an information area, while the rest of this area is erased and is available for writing a subsequent information area. This information area is subsequently written by reversing the magnetic field in the direction $M_2$ at the instant $t_2$, when the centre of the write spot has reached the position C, and by switching back the magnetic field in the direction $M_1$ at the instant $t_3$, when the centre of the spot has reached the position D. By switching the external magnetic field, while using a write spot moving at a continuous speed with respect to the record carrier, in time intervals which are shorter than the time interval required to move the write spot over a distance which is equal to its diameter, information areas can be written whose dimension in the scanning direction is smaller than said dimension of the write spot. These information areas may have a dimension of, for example, 0.35 μm in the scanning or track direction instead of the hitherto conventional dimension of the order of 1 μm.

Figure 7:
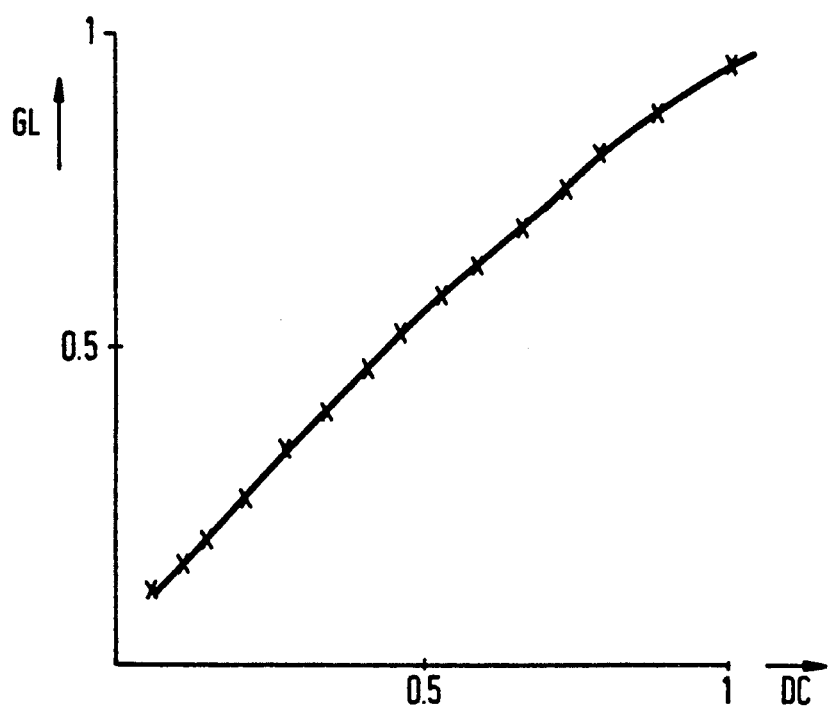
FIG. 7 shows different grey levels associated with the different length-period ratios of the information areas.

As already more or less shown in FIG. 5, the duty cycle (DC), or length-period ratio of the information areas, can be continuously varied so that the information signal can be written in analog form in the magneto-optical record carrier. FIG. 7 shows the result of a measurement on a magneto-optical record carrier whose information layer is composed of the materials gadolinium, terbium and iron and different track portions of which are written with different length-period ratios of the information areas. The measured grey level GL as a function of the said ratio DC has a very good linear variation.

Figure 8:
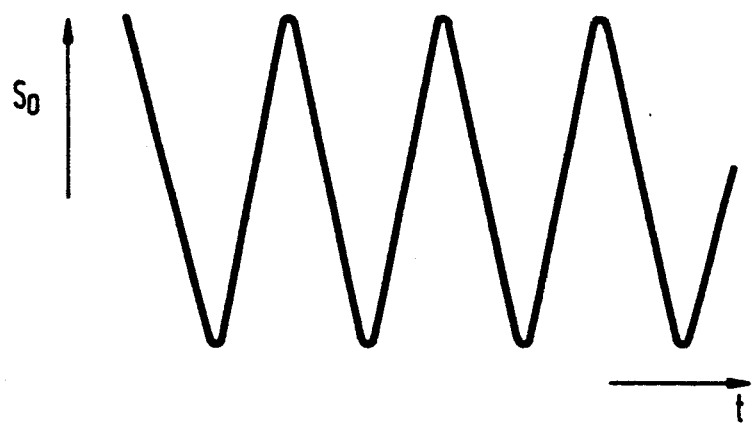
FIG. 8 shows the signal read from a record carrier in which a triangular signal is written in an analog form.

As a further illustration of the possibility provided by the present invention, FIG. 8 shows the output signal $S_o$ of the detection system 18 in FIG. 1 when reading a magnetic optical record carrier in which a triangular signal $S_i$ is written while using the method according to the present invention. By way of example the write speed may be 0.75 m/sec, the period of the information areas may be of the order of 0.75 μm and the period of the read triangular signal shown may be of the order of 10 μm.

In addition to this alloy of gadolinium, terbium and iron, other magnetic materials may be used as an information layer. Preferably, an alloy of terbium, iron and cobalt is used, which alloy is eminently suitable for writing very short domains, up to 0.1 μm. Such small domain lengths are required if an information density in the track direction of the order of 0.3 μm per bit instead of the currently maximum feasible density of 0.45 μm per bit is to be achieved, while using the present invention.

Figure 9:
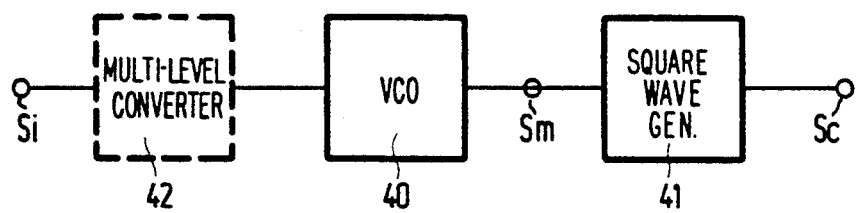
FIG. 9 shows a first embodiment of a control circuit according to the invention.
Figure 10:
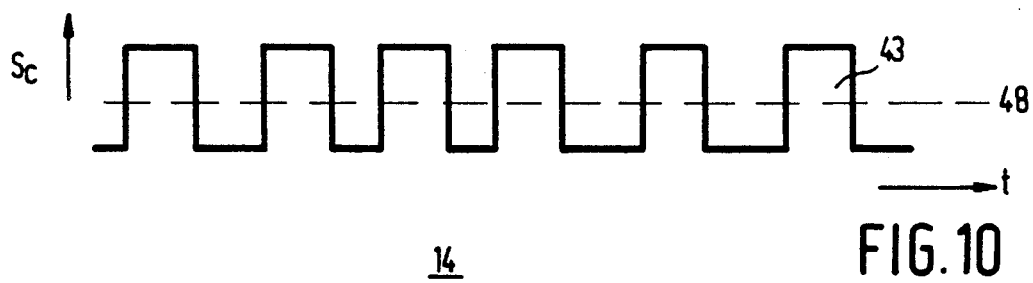
FIG. 10 shows the control signal supplied by this control circuit.

FIG. 9 shows diagrammatically a first embodiment of a control circuit 14 with which an input signal is converted into a pulsatory signal with duty cycle modulation. This circuit comprises a frequency modulator 40, for example, a voltage-controlled oscillator which converts the incoming information signal $S_i$ into a frequency-modulated signal $S_m$. The output of the modulator 40 is connected to the output of a monostable multivibrator 41 which converts the signal $S_m$ into a square-wave signal $S_c$ whose square-wave time interval 43 is constant and whose frequency, or period, varies in accordance with the value of the information signal $S_i$. The signal $S_c$, which has a variation as shown in FIG. 10, is applied to the energising current circuit 15 of FIG. 1 for switching the energising current through the coil 13, and thus the magnetic field generated by this coil, in such a way that a plurality of information areas is written in accordance with the number of blocks 43 of the signal $S_c$. These areas have a constant length and a varying period. The frequency of the signal $S_c$ is so high that the spatial frequency of the information areas is equal to or higher than the optical cut-off frequency of the apparatus.

If the signal $S_i$ to be written is not an analog but a digital signal, this signal is firstly converted by a converter 42 into a signal having a plurality of signal levels (multi-level signal) so that this signal can be treated in the same way as an analog signal.

Figure 11:
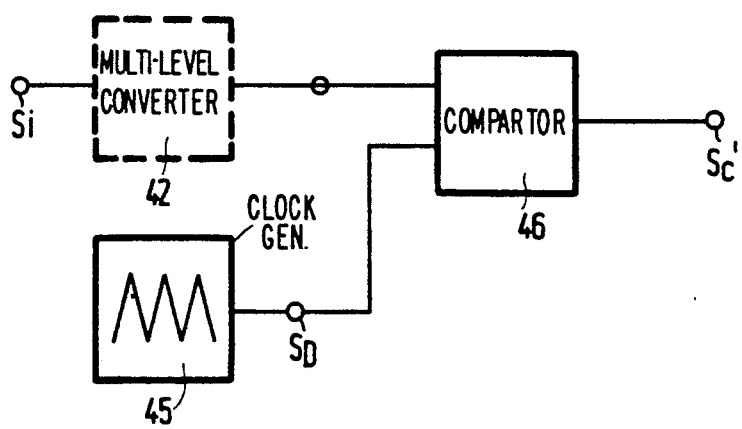
FIG. 11 shows a second embodiment of the control circuit according to the invention.

FIG. 11 shows an embodiment of a control circuit 14 which is preferably used, namely a circuit for generating a pulsatory control signal having a constant frequency and a varying pulse duration. If the signal to be written is an analog signal, this circuit comprises a clock voltage generator 45 which supplies a triangular voltage $S_D$ with a constant frequency and amplitude. The clock output of the voltage generator is connected to a first input of a comparator 46. The signal $S_i$ to be written is applied to the second input of the comparator. The frequency of the voltage $S_D$, the write-clock frequency, is, for example several times larger than that of the information signal $S_i$. The comparator supplies a square-wave voltage $S'_c$ shown in FIG. 12, whose frequency is constant and equal to the clock frequency of the generator 45, while the duration of the blocks or time intervals 47 varies in dependence upon the instantaneous value of the signal $S_i$. When the signal $S_c'$ is applied to the energising circuit 15, magnetic domains 4 are written which have a varying length and a constant spatial frequency. If the signal to be written is a digital signal, a converter 42 is again present for converting the digital signal into a multi-level signal.

Figure 12:
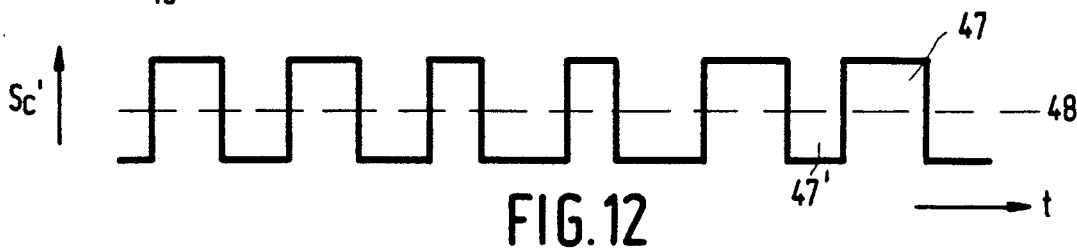
FIG. 12 shows the control signal supplied by this control circuit.

The signals $S_c$ and $S_c'$ of the FIGS. 10 and 12 are so-called NRZ signals, i.e. the pulses are alternately positive and negative and the zero level is between the two pulse levels, as is indicated by means of the broken line 48 in FIGS. 10 and 12. A magnetic field is then always present, not only when the information areas are written but also during the intermediate time intervals. It is thereby achieved that the intermediate areas always acquire a different direction of magnetisation than the information areas, independent of the local condition of the information layer to be written. Then a record carrier which is already written can be rewritten with new information without having to erase this record carrier first, as is described in published European Patent Application no. 0,230,325.

It will be evident that very light levels up to and including white can be written by means of the signal $S_c'$ of FIG. 12, in which the pulse duration of the pulses 47 can be rendered arbitrarily small with respect to that of the pulses intermediate intervals 47'. This is not possible with the control signal $S_c$ of FIG. 10 in which the pulse duration is constant.

The possibility provided by the invention of recording different grey levels may alternatively be used to store a signal in a digital form in a magneto-optical record carrier in a higher order digital encoding, for example, an octal encoding. The duty cycle of the energising current pulses is then varied in n discrete steps, in which n corresponds to the number of values of the encoding. The magnetic domains then have a fixed frequency which corresponds to, for example, several times the clock frequency of the encoding.

FIG. 13 shows the basic circuit diagram of an embodiment of an apparatus for writing and reading a digital signal having more than two signal levels.

The digital, for example octal, input signal $S_i$ is converted by a, for example, three-bit converter 50 into a multi-level signal having, for example, eight signal levels, which signal is applied to a duty cycle modulator 51. This modulator may have the same construction as is shown in FIG. 11. The output signal of the modulator is applied to the energising circuit 15 for the coil 13. The magnetic field generated by the coil 13 is switched at a high frequency by means of the control circuit 14, while varying the pulse duration in n, for example, eight discrete steps so that information areas in the form of magnetic domains are written in the record carrier 1, the length of said domains having n, for example eight, different values, dependent on the instantaneous value of the input signal $S_i$.

The signal stored in the information areas may be read by means of an optical read head 53 which may comprise the same elements 10, 11, 12, 17, 18, 19, 20, 21, 22 and 23 as the read head shown in FIG. 1. The output signal of the radiation-sensitive detector 18 is applied to a, for example, three-bit converter 54 which converts the multi-level, signal having, for example, eight signal levels into a digital, for example octal, encoded signal $S_o$ which corresponds to the signal $S_i$.

This signal may be a double modulated digital signal and may be formed, for example by the superposition of the known EFM signal and a second digital signal. The EFM signal is the signal which is used as a standard to store digital audio information in the optical record carrier which is known under the name of "Compact Disc" or "CD". As described in, for example, the article "Compact Disc System Aspects and Modulation" in "Philips Technical Review", 40, 1982, no. 6, pages 157-164, the EFM signal is obtained by converting each group of eight data bits into a group of fourteen channel bits in accordance with a given prescription, while series of at least three and at most eleven identical bits occur in the channel bit current. For the record carrier this means that the information areas comprise at least three and at most eleven channel bits, in which, for example, the beginning of an information area and the beginning of an intermediate area represent a digital 1. For the rest, the information areas and the intermediate areas then comprise only digital 0s.

FIG. 14a shows a small portion of an example of a digital bit current and FIG. 14b shows the associated structure of information areas on the record carrier. FIG. 14c shows the variation of the signal level of the EFM signal ES which is a so-called NRZ signal. A second signal AS having a higher frequency can be superposed on this signal, which second signal is shown in FIG. 14d. FIG. 14e shows the variation of the signal level of the composite signal CS. This signal has four signal levels. When recording this signal on the record carrier, magnetic domains are produced with four different ratios between the domain length and the period. When writing the signal CS in the record carrier by means of energising current pulses having a constant frequency and a varying pulse duration, with each signal value of the signal CS being fixed in two periods of the domain pattern, this pattern has a variation as is shown in FIG. 14f for the first portion of the signal CS.

Figure 15:
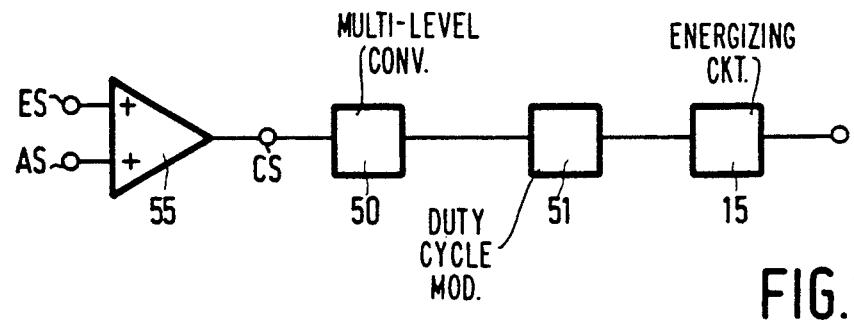
FIG. 15 shows the basic circuit diagram of a part of the apparatus used according to the invention.

For recording the signal CS the circuit according to FIG. 15 can be used, which comprises as a first element a summing device 55 to which the signal ES and the signal AS are applied and which supplies the composite signal CS as an output signal. This signal is written in the same way as described with reference to FIG. 13. Thus, a double digitised signal, or an amplitude- and time-discrete signal, and hence extra information can be written, using two clock frequencies both during writing and subsequent reading.

It is to be noted that notably when writing a signal with four levels, in which the duration of a signal level comprises two periods of the triangular voltage $S_D$ in FIG. 11, the comparator 46 is preferably caused to switch at the maximum or minimum values of the triangular signal. It is true that a domain pattern is then obtained which is slightly asymmetrical, but it does not outweigh the advantage that the domain transitions are well defined. If switching took place at the intermediate levels of the triangular voltage $S_D$, the domain pattern would be symmetrical but then a shift would occur in the domain transitions which is expressed in a diagonal shift of the eyes in the so-called "eye pattern" so that problems with respect to reading of the domains could occur. The said eye pattern and its use is described in the above quoted article in "Philips Technical Review", 40, 1982, pages 157-164.

It is further to be noted that the condition, which has been mentioned several times, of the spatial frequency of the domains being equal to or larger than the optical cut-off frequency is not absolute. Also for a spatial frequency of the domains which is smaller than but is proximate to the optical cut-off frequency, grey levels can be written with still reasonable results.

When writting the information a laser beam having a constant and high intensity level is preferably used in view of the high recording frequency. It is then ensured in the simplest manner that the material of the information layer is always locally heated to a sufficient extent to vary its direction of magnetisation in dependence upon the magnetic field modulation.

Under some circumstances a pulsed laser beam may alternatively be used, the laser pulses with a pulse duration of, for example 20 n sec being generated by means of a laser modulation circuit of a conventional type which is denoted by 16 in FIG. 1.

Pulse operation of the laser places a smaller load on this laser and thus increases its lifetime. A further advantage is that the thermal load of the information layer, and hence the rate at which the record carrier ages, is lower than in the case of writing with a radiation beam of a constant intensity.

Figure 16:
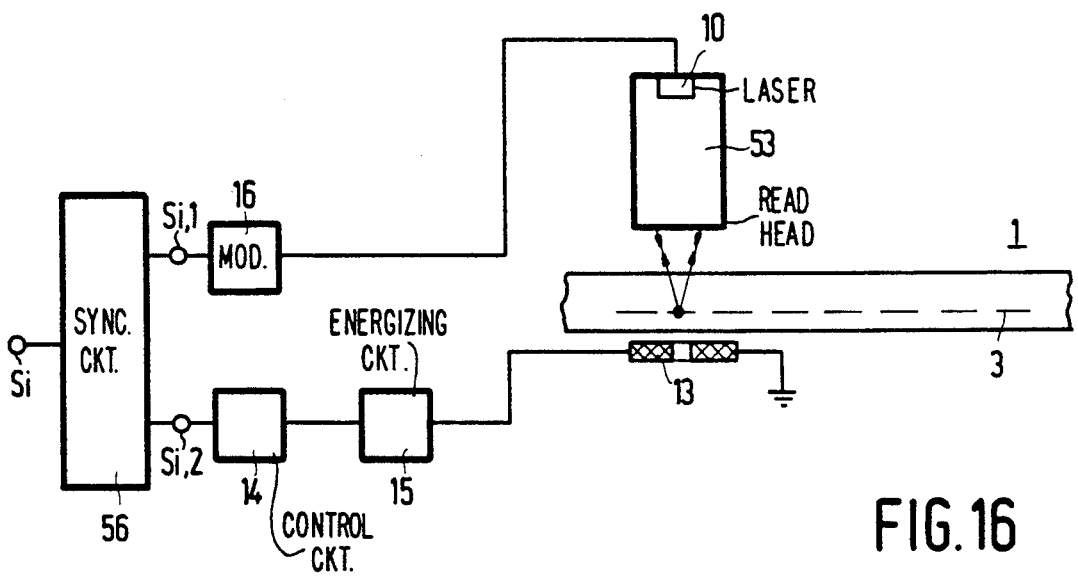
FIG. 16 shows a further embodiment of the apparatus according to the invention.

A fixed phase relation must be maintained between the points of reversal of the energising current and the radiation pulses of a pulsed laser. To this end, in recording apparatus which operates with radiation pulses, and which is shown diagrammatically in FIG. 16, such apparatus comprises a synchronising circuit 56. This circuit derives from the information signal $S_i$ control signals $S_{i,1}$ and $S_{i,2}$ with the same frequency for the laser modulation circuit 16 and the current control circuit 14, respectively. The current control circuit 14 now supplies a square-wave signal which is modulated in accordance with the information to be written, which square-wave signal is converted by the energising circuit 15 into a square-wave energising current for the coil 13.

It is preferably ensured that the instant when a radiation pulse ends coincides in principle with the instant when the magnetic field, which has just changed sign, has reached a maximum value so that the relevant area is magnetised in the desired direction by means of a maximum magnetic field. This is illustrated in FIG. 17 in which, on a considerably enlarged time scale, the reference numeral 60a denotes a radiation pulse and 63 denotes a transition between the negative value $I_{min}$ and the positive value $I_{max}$ of the energising current.

Figure 17:
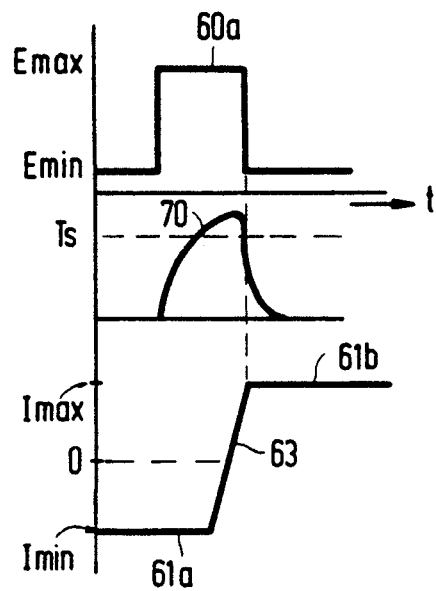
FIG. 17 shows a radiation pulse, the temperature variation in the information layer caused thereby and an energising current pulse as a function of time.

The reference numeral 70 in FIG. 17 denotes the temperature variation as a function of time for an area of the information layer 3 irradiated by radiation pulse 60a. As a result of the supplied radiation energy, the temperature in this area rises rapidly above the write temperature Ts, which indicates the temperature above which the direction of magnetisation of the record layer can be changed by the generated magnetic field. The write temperature Ts is generally proximate to the Curie temperature of the material of the information layer.

After the end of the radiation pulse 60a the material cools down very rapidly to approximately its ambient temperature due to the transport of heat in the information layer 3.

Figure 18A:
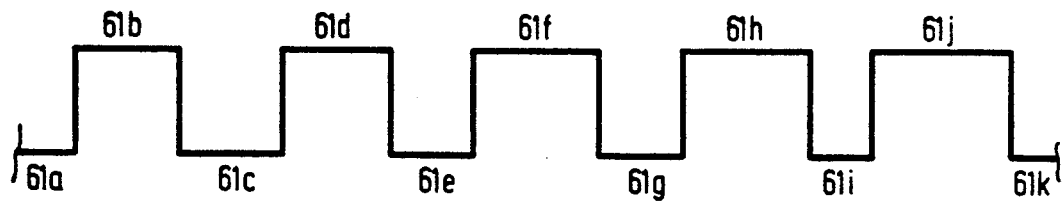
FIGS. 18(a)-(d) show the relationship between the energizing current pulses, the radiation pulses, the magnetic domains, and the information areas.
Figure 18B:
Figure 18C:
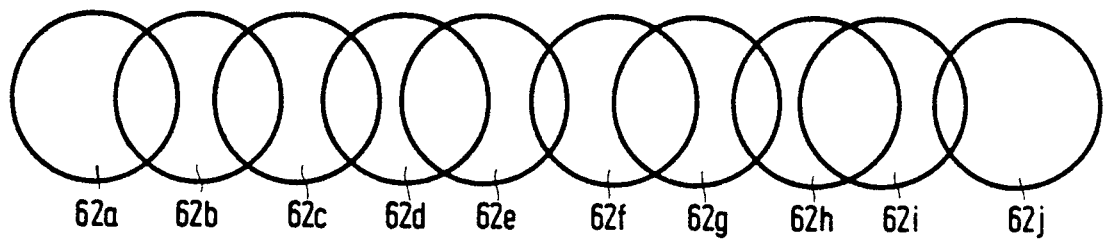
Figure 18D:
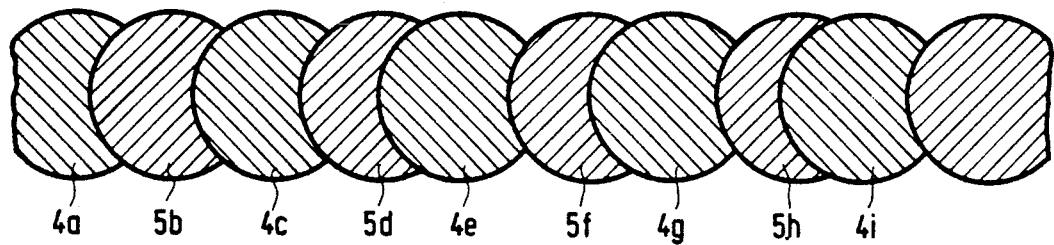

The duration of the radiation pulse 60a in FIG. 18b and the phase relation between this pulse and the point of reversal of level 61a to level 61b of the energising current in FIG. 18a are chosen to be such that the information layer is cooled at a positive value of the energising current so that the area 62a in FIG. 18c is permanently magnetised in the direction of magnetisation associated with this value and an information area 4a is produced, as is illustrated in FIG. 18d.

After some time, which is determined by the information signal to be written, the energising current changes sign and reaches the maximum negative level 61c at a given moment. At that moment a second radiation pulse 60b which has heated an area 62b of the information layer ends, which area partly overlaps the area 62a. The area 62b is then magnetised in a direction which is opposite to that in which the area 62a is magnetised and a magnetic domain or intermediate area 5b is produced. After magnetisation of the area 62b the areas 62c . . . 62j are successively and alternately in the opposite direction magnetised by means of the energising current levels 61d . . . 61j and the radiation pulses 60c . . . 60j, so that a pattern of magnetic domains, or information areas 4 with a first direction of magnetisation and magnetic domains, or intermediate areas 5 with a second, opposite direction of magnetisation are obtained, as is shown in FIG. 18.

It is to be noted that the information areas 4e and 4g are longer than the information areas 4a and 4c, but shorter than the information area 4i. This is the result of the differences between the lengths of the energising current squares 61f, 61h and 61j. For the accuracy with which the boundaries of the magnetic domain to be formed are positioned, it is important that the temperature gradient at the area of the domain boundaries is high.

It will be evident that the influence of variations of the write sensitivity and strength of the magnetic field on the accuracy with which the boundary of the formed magnetic domain is positioned is smaller as the temperature gradient in the boundary region is larger.

It is to be noted that the temperature gradient increases as the required energy is supplied to the information layer within a shorter time. It is then also advantageous to choose the length of the radiation pulses to be small with respect to the repetition time.

Figure 19:
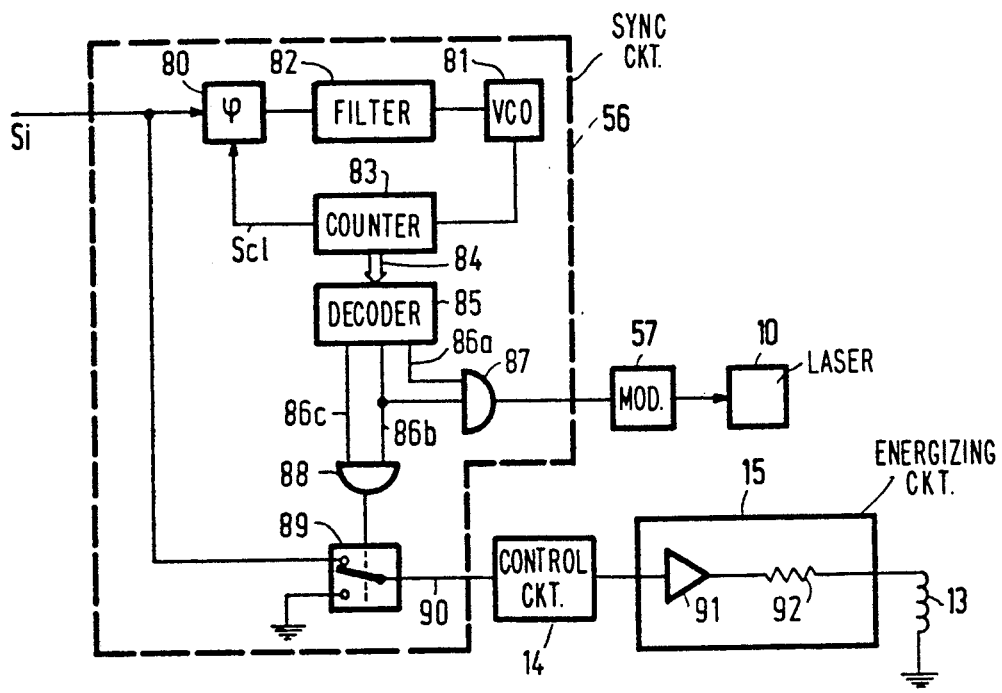
FIGS. 19 and 20 show different embodiments of a synchronising circuit used in the apparatus.

FIG. 19 shows a first embodiment of the synchronising circuit 56 in FIG. 6 which is suitable for controlling the recording of a digital information signal $S_i$ with a given bit frequency, for example, an NRZ-modulated signal. The synchronising circuit shown in FIG. 19 comprises a circuit for regaining a channel clock signal $S_{cl}$ having the same frequency as the bit frequency of the information signal $S_i$. Such a circuit may comprise a phase detector 80 of a conventional type, which at each zero crossing of the information signal $S_i$ determines the phase difference between this zero crossing and the clock signal $S_{cl}$. The phase detector 80 applies a signal, which is indicative of the given phase difference, to a voltage-controlled oscillator 81 via a loop filter 82. The oscillator generates a periodical signal with a frequency which is an integral multiple of the channel clock signal $S_{cl}$, from which periodical signal the channel clock signal $S_{cl}$ is derived by means of frequency division which is performed with the aid of a counter 83. The phase detector 80, the loop filter 82, the voltage-controlled oscillator 81 and the counter 83 constitute a phase-locked loop circuit of a conventional type.

The count of counter 83 is applied via a bus 84 to the decoding circuit 85 which generates three logic "1" signals 86a, 86b and 86c when three respective successive counts are reached. The signals 86a and 86b are applied to the inputs of a dual-port AND gate 87. The output signal of AND gate 87 is applied to the laser modulation circuit 57 which in response to each pulse of the output signal of AND gate 87 generates a pulsatory control signal for the laser 10. The signals 86b and 86c are applied to a dual-port AND gate 88. The output signal of AND gate 88 serves as a control signal for an electronic switch 89. The information signal $S_i$ is applied to a first input of the switch 89, while a second input of the switch 89 is connected to ground potential. The electronic switch 89 connects the output thereof to the first or the second input thereto, dependent on the logic value of the control signal from AND gate 88. The signal 90 thus obtained at the output of switch 89 is a square-wave signal with a frequency which is equal to the bit frequency of the signal $S_i$, while the polarity is determined by the instantaneous polarity of the information signal $S_i$. The signal 90 is applied to the control circuit 14. The energising current supply circuit 15 may be, for example, a power amplifier 91 which generates a voltage which is proportional to the input voltage of the amplifier 91. The output of the amplifier 91 is connected to the coil 13 via a resistor 92, which resistor 92 functions as a limiting resistor for the energising current. The resistance of resistor 92 and the inductance of the coil 13 are adapted to each other in such a way that the time constant of the RL circuit formed is small with respect to the pulse width of the energising current pulse.

Figure 20:
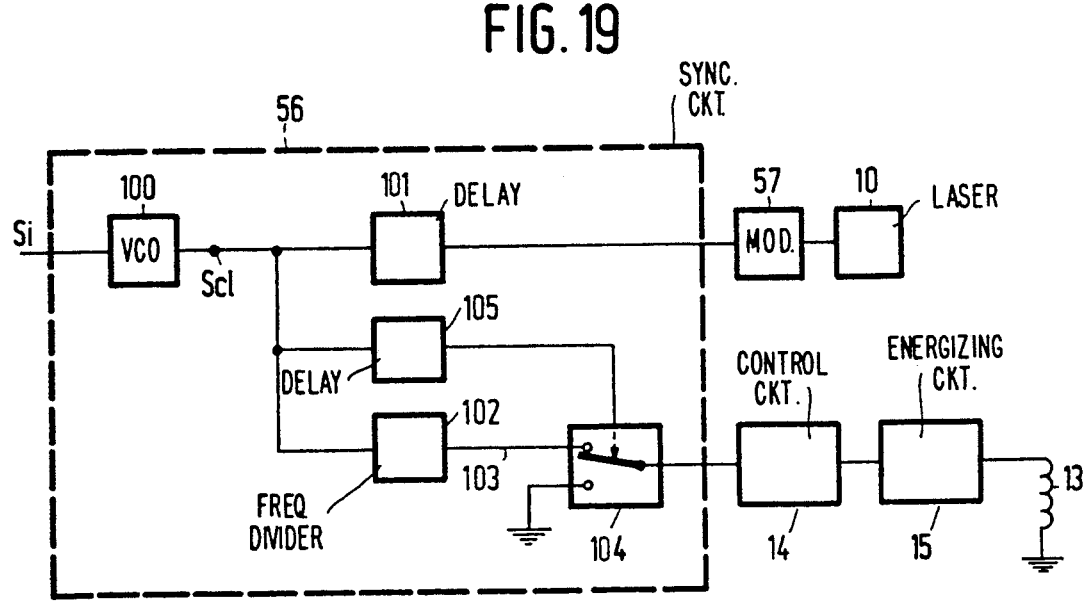

FIG. 20 shows a second embodiment of the synchronising circuit 56 which is suitable for recording FM-modulated signals. The circuit comprises a voltage-controlled oscillator 100 for generating a periodical pulsatory signal $S_{cl}'$ whose frequency is modulated in accordance with an input signal $S_i'$. The control signal for the laser modulation circuit 57 is directly derived from the FM-modulated signal $S'_{cl}$ by means of a delay circuit 101 which delays the signal $S'_{cl}$ over a given time interval. The control signal for the control circuit 14 is also derived from the FM-modulated signal. To this end the synchronising circuit 56 comprises a frequency divider 102 which derives an NRZ signal 103 from the signal $S'_{cl}$ at a frequency which is an integral number of times (for example, four times) lower than the frequency of the signal $S_{cl}$. The signal 103 is applied to a first input of an electronic switch 104. A second input of the electronic switch 104 is connected to ground potential. The control signal for the electronic switch 104 is directly derived from the signal $S_{cl}'$ by means of a delay circuit 105. The delay times of the delay circuit 105 and delay circuit 101 are chosen to be such that a pulse of the output signal of circuit 101 is located at each point of reversal of the output signal of circuit 105, and this in such a way that the end of a pulse at the output of circuit 101 substantially coincides with the instant when the output signal of the control circuit has reached a new final value.

Figure 21:
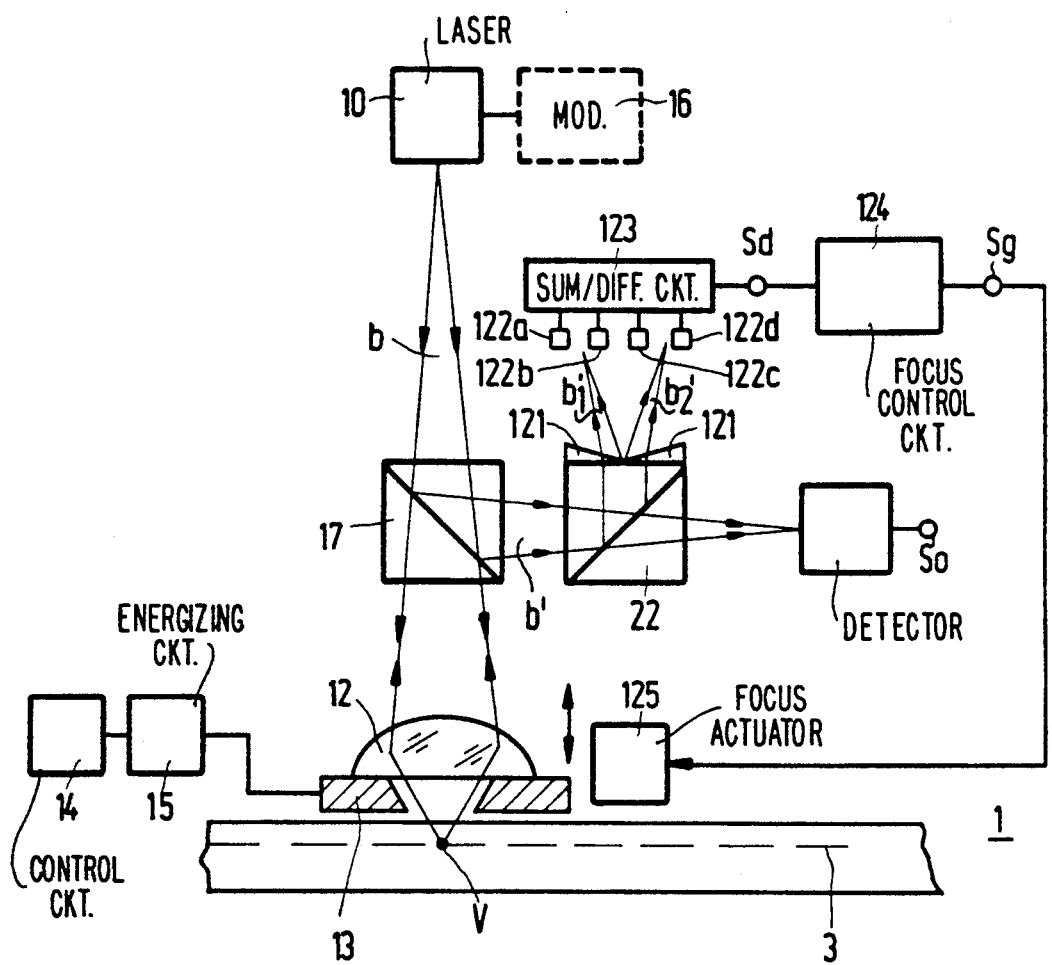
FIG. 21 shows a further embodiment of the apparatus according to the invention.

FIG. 21 shows a further embodiment of the recording apparatus according to the invention. In FIG. 21 the components which correspond to the components shown in FIG. 1 have the same reference numerals. The recording apparatus shown in FIG. 21 has a focusing control of a conventional type comprising the objective lens 12, the partly transparent prism 17, the partly transparent prism 22, a roof prism 121, a system of, for example, four radiation-sensitive detectors 122a, 122b, 122c and 122d, a sum/difference circuit 123, a focus control circuit 124 and a lens focus actuator 125. The beam b' reflected by the information layer 3 is passed to the roof prism 121 by means of the prisms 17 and 22. This prism 121 splits the beam b' into two subbeams $b'_1$ and $b'_2$ which are each incident on a separate pair of detectors 122a, 122b and 122c, 122d, respectively. The output signals of these detectors are applied to the circuit 123 in which the difference between the sum of the output signals of the detectors 122a and 122d and the sum of the output signals of the detectors 122b and 122c is determined. This difference signal is indicative of the degree of focusing of the scanning beam b on the information plane 3. The difference signal $S_d$ is applied to the focus control circuit 124 which generates such a control signal $S_f$ for the lens focus actuator 125 that the actuator 125 keeps the radiation beam b focused on the information layer 3 by way of movement of the lens 12, which means that the distance between the lens 12 and the information layer 3 is maintained constant.

If a coil having a transparent core, for example an air-cored coil is used for the coil 13, the coil 13 may be secured to the lower side of the lens 12 so that the radiation beam b is directed onto the information layer via the transparent core of the coil 13. Such a construction has the advantage that the distance between the coil 13 and the information layer is maintained constant during recording, which means that the circumstances under which the area of the information layer 3 heated by the radiation beam b is magnetised always remains constant, which contributes to the recording quality.

We claim:

1. A method of optically writing and reading information by forming a pattern of magnetic domains in a recording layer of a record carrier, said domains having directions of magnetization which differ from their surroundings; said method comprising:

focusing an optical scanning beam into a diffraction-limited radiation spot for scanning said recording layer;

during writing of an information signal, subjecting the region of the recording layer under the radiation spot to a magnetic field directed substantially perpendicular to the recording layer and which is generated by a coil energized by a square-wave energizing current which is modulated in accordance with the information signal, thereby forming successive magnetic domains in said recording layer having alternately reverse directions of magnetization; and reading the recorded information signal by detecting the variation caused by said magnetic domains in the polarization of radiation produced from the record carrier during scanning thereof by the radiation spot;

characterized in that:

the frequency and amplitude of said square-wave energizing current are independent of the information signal to be written, and the frequency thereof exceeds the optical cut-off frequency determined by the size of the radiation spot; and during writing of the information signal the duty cycle of said square-wave energizing current is modulated in accordance with such signal so as to write said magnetic domains with a varying ratio between the domain length and the domain period in the scanning direction, the different values of said ratio representing different values of the written information signal.

2. A method as claimed in claim 1, wherein said energizing current has constant square-wave pulse intervals and a period which varies in accordance with different values of said information signal.

3. A method as claimed in claim 1, wherein said energizing current has a constant period and the square-wave pulse intervals thereof vary in accordance with different values of said information signal.

4. A method as claimed in claim 1, wherein the duty cycle of said energizing current is continuously varied in accordance with different values of said information signal, so that such signal is recorded in analog form.

5. A method as claimed in claim 1, wherein said energizing current has a fixed frequency and the duty cycle thereof is varied in n discrete steps in accordance with different values of said information signal, n being an integer.

6. A method as claimed in claim 1, wherein said scanning beam has a constant intensity during writing of said information signal.

7. A method as claimed in claim 1, wherein said scanning beam is pulsed during writing of said information signal.

8. A method as claimed in claim 7, wherein each radiation pulse is produced proximate in time with a reversal of said energizing current and terminates at the instant at which the reverse magnetic field produced by the reversed magnetizing current substantially reaches its final value.

9. An apparatus for optically writing and reading information by forming a pattern of magnetic domains in a recording layer of a record carrier, said domains having directions of magnetization which differ from their surroundings; said apparatus comprising:

a radiation source for supplying a radiation beam for scanning said recording layer;

an objective system for focusing the scanning beam into a diffraction-limited radiation spot on the recording layer;

a radiation-sensitive detection system for converting radiation from the recording layer produced during scanning thereof into an electric signal;

a magnetic coil for generating a magnetic field in the portion of the recording layer under the scanning spot, said magnetic field being directed substantially perpendicular to said recording layer;

an energizing circuit for generating a square-wave energizing current in said magnetizing coil; and a control circuit for controlling said energizing circuit in accordance an information signal to be recorded, so that said energizing current causes said magnetic coil to generate a magnetic field which forms magnetic domains in said recording information layer;

characterized in that said control circuit is adapted to control said energizing circuit so that the energizing current produced thereby is a square-wave having a frequency which is independent of the information signal and exceeds the optical cutoff frequency determined by the size of said scanning spot, said square wave having a duty cycle which varies in accordance with different values of said information signal.

10. An apparatus as claimed in claim 9, wherein said control circuit comprises a frequency modulator having an input to which said information signal is applied and having an output connected to a monostable multivibrator, said multivibrator bring adapted to produce a control signal for said energizing circuit for controlling the energizing current produced thereby.

11. An apparatus as claimed in claim 9, wherein said control circuit comprises a comparator having a first input to which said information signal is applied and having a second input connected to a triangular voltage generator, the output of said comparator producing a control signal for said energizing circuit for controlling the energizing current produced thereby.

12. An apparatus as claimed in claim 11, wherein said control circuit further comprises a converter to which said information signal is applied and which is adapted to convert it into a multi-level signal, said multi-level signal being the signal which is supplied to said first input of said comparator.

13. An apparatus as claimed in claim 9, wherein said radiation source is adapted to supply a write scanning beam having a constant intensity for writing said information signal in said recording layer.

14. An apparatus as claimed in claim 9, wherein said radiation source is adapted to supply a write scanning beam which is pulsed for writing said information signal in said recording layer, and said apparatus further comprises a synchronizing circuit coupled to said radiation source and to said energizing circuit, said synchronizing circuit being adapted to maintain a predetermined phase relation between the radiation pulses of said write scanning beam and the reversals of the square-wave energizing current produced by said energizing circuit.

15. An apparatus as claimed in claim 14, wherein said predetermined phase relation is such that each radiation pulse terminates at the instant at which the reversed magnetic field produced by a reversal of said energizing current substantially reaches its final value.

16. An apparatus as claimed in claim 14, wherein the information signal is a digital signal having a given bit frequency, said synchronizing circuit is adapted to synchronize generation of radiation pulses by said radiation source and generation of pulses of energizing current by said energizing circuit with the bit frequency of the digital information signal, and said control circuit is adapted to control said energizing circuit so that the pulses of energizing current produced thereby have polarities which correspond to the logic values of the bits of the digital information, signal.

17. An apparatus as claimed in claim 16, further comprising an oscillator for generating a periodic signal from which said synchronizing means is adapted to determine the instants at which the radiation pulses and the pulses of energizing current are to be generated, said synchronizing means being further adapted to control said oscillator so as to maintain a fixed phase relation between said periodic signal and said information signal.

18. An apparatus as claimed in claim 17, further comprising phase-comparating means for determining the phase difference between said periodic signal and said information signal, and means for synchronizing such signals on the basis of such phase difference.

19. An apparatus as claimed in claim 14 wherein the information signal to be recorded is an FM-modulated signal, and said synchronizing circuit comprises: an oscillator for generating a periodic signal, means for synchronizing the radiation pulses produced by said radiation source with said periodic signal, and means for synchronizing the pulses of energizing current produced by said energizing circuit with said periodic signal so that such pulses are of successively opposite polarities.

20. An apparatus as claimed in claim 9, wherein: said objective system comprises means for focusing said radiation beam; said apparatus further comprises means for maintaining a predetermined distance between said focusing means and said recording layer of the record carrier so that the radiation beam remains focused on said recording layer; and said magnet coil has a radiation transparent core and is mechanically coupled to said focusing means, said magnet coil being arranged so that the radiation beam passes through the coil core to reach said recording layer.

21. A method as claimed in claim 2, wherein the duty cycle of said energizing current is continuously varied in accordance with different values of said information signal, so that such signal is recorded in analog form.

22. A method as claimed in claim 3, wherein the duty cycle of said energizing current is continuously varied in accordance with different values of said information signal, so that such signal is recorded in analog form.

23. A method as claimed in claim 2, wherein said energizing current has a fixed frequency and the duty cycle thereof is varied in n discrete steps in accordance with different values of said information signal, n being an integer.

24. A method as claimed in claim 3, wherein said energizing current has a fixed frequency and the duty cycle thereof is varied in n discrete steps in accordance with different values of said information signal, n being an integer.

25. An apparatus as claimed in claim 15, wherein the information signal is a digital signal having a given bit frequency, said synchronizing circuit is adapted to synchronize generation of radiation pulses by said radiation source and generation of pulses of energizing current by said energizing circuit with the bit frequency of the digital information signal, and said control circuit is adapted to control said energizing circuit so that the pulses of energizing current produced thereby have polarities which correspond to the logic values of the bits of the digital information signal.

26. An apparatus as claimed in claim 15 wherein the information signal to be recorded is an FM-modulated signal, and said synchronizing circuit comprises: an oscillator for generating a periodic signal, means for synchronizing the radiation pulses produced by said radiation source with said periodic signal, and means for synchronizing the pulses of energizing current produced by said energizing circuit with said periodic signal so that such pulses are of successively opposite polarities.

* * * * *